(12) United States Patent
Spiesberger

(10) Patent No.: US 6,435,114 B1
(45) Date of Patent: Aug. 20, 2002

(54) MACHINE FOR SOWING INDIVIDUAL SEED GRAINS

(75) Inventor: Franz Spiesberger, Lohnsburg (AT)

(73) Assignee: Wintersteiger GmbH, Ried (AT)

( * ) Notice: Subject to any disclaimer, the term of this patent is extended or adjusted under 35 U.S.C. 154(b) by 0 days.

(21) Appl. No.: 09/890,777

(22) PCT Filed: Dec. 5, 2000

(86) PCT No.: PCT/AT00/00327

§ 371 (c)(1),
(2), (4) Date: Aug. 6, 2001

(87) PCT Pub. No.: WO01/41553

PCT Pub. Date: Jun. 14, 2001

(30) Foreign Application Priority Data

Dec. 6, 1999 (AT) ............................................. 2050/99

(51) Int. Cl.$^7$ ................................................. A01C 7/04
(52) U.S. Cl. ....................................... 111/185; 221/211
(58) Field of Search ................................ 111/185, 184, 111/183, 177; 221/211, 278

(56) References Cited

U.S. PATENT DOCUMENTS 4,896,616 A   1/1990   Wintersteiger et al. ...... 111/185

FOREIGN PATENT DOCUMENTS

| AT | 364 660 | 11/1981 |
| AT | 378 463 | 8/1985 |
| DE | 34 18 551 | 11/1985 |
| DE | 0 195 900 | 10/1986 |
| DE | 31 03 101 | 6/1988 |

*Primary Examiner*—Christopher J. Novosad
(74) *Attorney, Agent, or Firm*—Collard & Roe, P.C.

(57) ABSTRACT

The invention relates to a machine for sowing individual seed grains. The inventive machine comprises at least one hopper (14) that is open towards a vertical sowing disc (1) that consists of a stationary disc body (3) which is exposed to suction on the side facing away from the hopper (14) and has at least one guiding slot (16). The sowing disc also consists of a conveyor disc (4) that can be driven, rests on the disc body (3) on the side of the hopper (14) and has carrier slots (21) that are distributed over the circumference, extend over the radial extension area of the guiding slot (16) and, together with the guiding slot (16), form aspir.

5 Claims, 4 Drawing Sheets

MACHINE FOR SOWING INDIVIDUAL SEED GRAINS

CROSS REFERENCE TO RELATED APPLICATIONS

Figure 1:
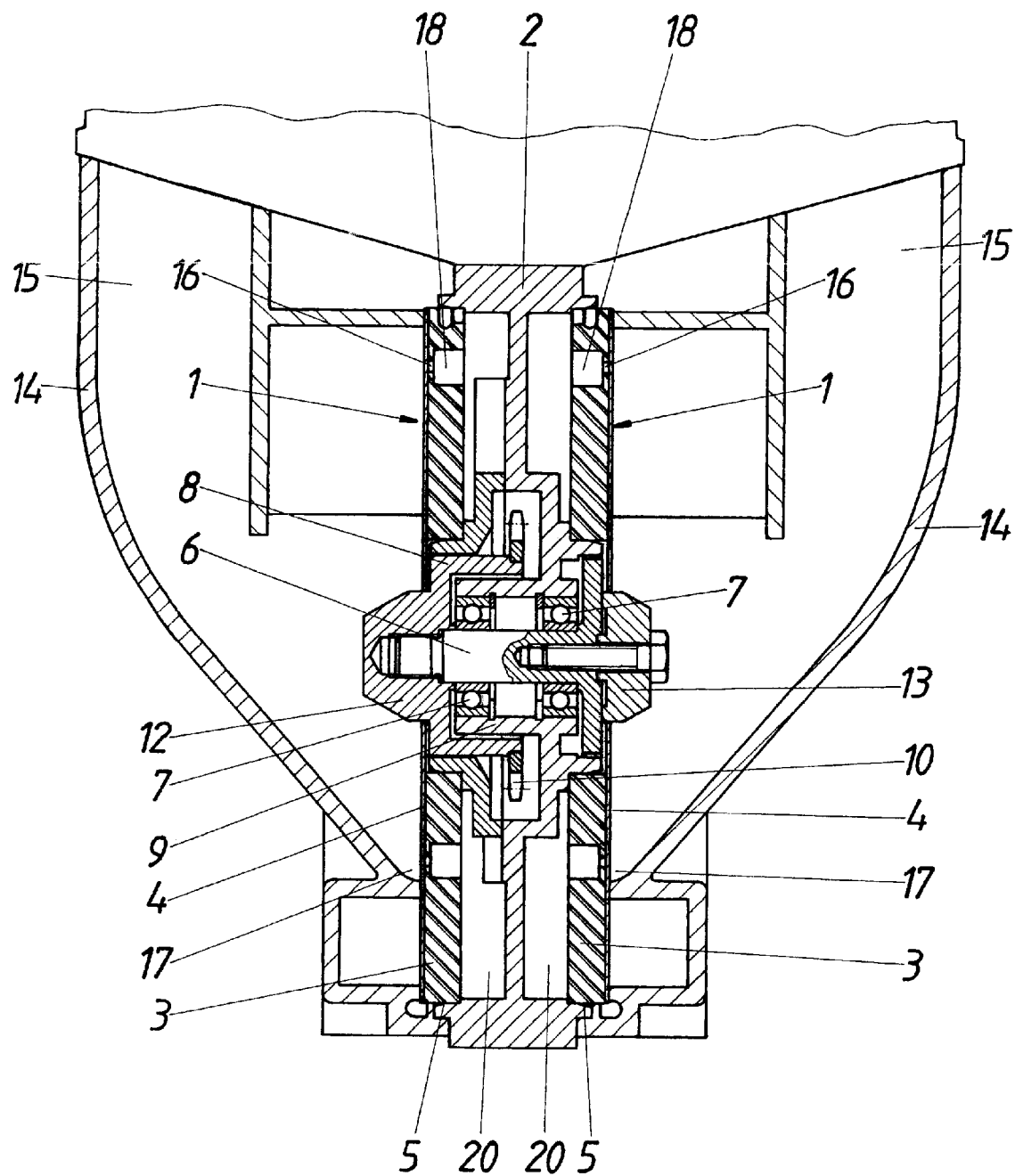

Applicant claims priority under 35 U.S.C. §119 of AUSTRIAN Application No. A 2050/99, filed on Dec. 6, 1999. Applicant also claims priority under 35 U.S.C. §120 of PCT/AT00/00327, filed on Dec. 5, 2000. The international application under PCT article 21(2) was not published in English.

1. Technical Field

The present invention relates to a machine for sowing individual seed grains having at least one hopper open towards a vertical sowing disc, whereby the sowing disc comprises a stationary disc body exposed to suction on the side averted from the hopper, having at least one guiding slot and also comprising a driveable conveyor disc resting on the side of the hopper on the disc body with carrier slots distributed over the circumference and also extending over the radial extension area of the guiding slot, which together with the guiding slot form the aspiration apertures in the overlapping area for the seed grains which can be discharged from the seed hopper along the guiding slot.

2. Prior Art

In order to ensure proper thinning of seed grains and even delivery of the thinned seed grains, machines for sowing individual seed grains (DE 31 03 101 C2, US 4 896 616 A) are known to divide the sowing discs into a stationary disc body and a conveyor disc resting on this disc body which is provided with radial carrier slots. Because the disc body is provided with a guiding slot extending over a circumferential area forming a discharge path for the die seed grains, which is suctioned on the side averted from the conveyor disc, aspiration apertures for the seed grains, which are distributed along the guiding slot from the hopper attached to the sowing disc, are located in the overlapping area of the carrier slots with the guiding slot. The seed grains suctioned onto the aspiration apertures come into contact with both the stationary disc body and with the rotating conveyor disc, which leads to rotation of the suctioned seed grains, to the effect that one of the seed grains suctioned to a aspiration aperture covers the aspiration aperture while the remaining seed grains are held back, and while the remaining seed grains fall back into the hopper. Since the suctioned seed grains tend to be drawn deeper into the aspiration apertures on account of their rotation, somewhat uneven separation of the seed grains thinned out by the sowing disc at the end of the guiding slot has to be reckoned with. For this uneven seed discharge not to result in uneven planting distances by the machine for sowing individual seed grains, a bucket feeder rotating with the conveyor disc is provided, in turn providing automatic discharge at preset intervals independent of the seed separation. In addition, the discharge rate and thus the sowing rate of such a machine for sowing individual seed grains is restricted on account of the thinning procedure requiring the grain to rotate.

DESCRIPTION OF THE INVENTION

The object of the invention is accordingly to provide a machine for sowing individual seed grains of the type described at the outset in such a way that the discharge rate of the thinned out seed grains can be considerably increased, without having to dispense with secure thinning, and also with seed grains having comparatively large differences in dimensions.

The present invention solves this task by the fact that the angle between the longitudinal edges of the carrier slots and the guiding slot in the overlapping area of these slots at least on one slot side along the guiding slot are repeatedly changed within a predetermined angle range.

Because the angle between the longitudinal edges of the carrier slots bordering the aspiration apertures and of the guiding slot changes repeatedly whenever the conveyor disc is rotated, the aspirated seed grains are also turned around in the vicinity of the aspiration apertures over the longitudinal edges of the criss-crossing slots, which extensively supports the thinning out effect. The improved thinning of the seed grains contributes the desired increase in output, because the seed grains are properly thinned out also when the conveyor disc is rotated at higher speeds, and independently of relevant differences in size of the seed grains. As the aspirated seed grains are being rotated and pulled through the longitudinal edge profile of the slots in the vicinity of the aspiration apertures, this occurs independently of seed size.

The longitudinal edge profile of the slots in the conveyor disc and/or in the disc body can vary and be adapted to the geometric ratios determined by the seed to be sown. It is required that not all seed grains are displaced from the aspiration area, so that the angle between the longitudinal edges of the crisscrossing slots bordering the aspiration apertures should be altered in a permissible angle range. If the slot edges have a corrugated profile, these requisites can be easily met. The range and lengths of these waves of the slot edges are selected advantageously depending on the seed material to be sown. The slot edges can also be provided to form the corrugated profile with edge-side depressions, by means of which an additional movement vertical to the sowing disc can be exerted on the seed grains, effectively supporting the thinning out procedure.

Particularly advantageous discharge ratios result for the seed, if the guiding slots in the disc body are not as wide as the carrier slots in the conveyor disc. When the width of the carrier slots is adequate this measure enables the seed grains to lie flat on the disc body between the longitudinal edges of the carrier slots, which is why the tendency of the seed grains to penetrate more deeply into the guiding slot can be extensively prevented. In this case the guiding slot can be configured correspondingly narrow. With the seed grains lying flat on the sowing disc separating the seed grains is facilitated by the sowing disc, if the seed grains exit from the suctioned area of the guiding slot and then fall from the sowing disc, so that an adequately limited separation point of the seed grains by the sowing disc can be reckoned on. This fulfils all requirements for being able to dispense with a bucket feeder for evening out the seed discharge. This applies in particular if the guiding slot remains unaffected by suction in the vicinity of a downwards directed discharge end, since said unsuctioned discharge end of the guiding slot forms additional guide help for the seed grains separating from the sowing disc.

To be able to safely interrupt the seed discharge in spite of rotation of the conveyor disc dependent on the travel speed of the machine for sowing individual seed grains, at least one nozzle directed towards the guiding slot can be provided in the vicinity of a section of the guiding slot rising from the floor area of the hopper, which, when impacted, uses compressed air to blow the seed grains still entrained after aspiration impact of the guiding slot is switched off with the conveyor disc by the sowing disc back into the hopper. While impacting of the guiding slot is interrupted in the section under the nozzle, aspiration of the guiding slot is maintained in the section attached to the nozzle at least until the last seed grain, not yet blown away by the sowing disc, is discharged.

BRIEF DESCRIPTION OF THE DIAGRAMS

Figure 2:
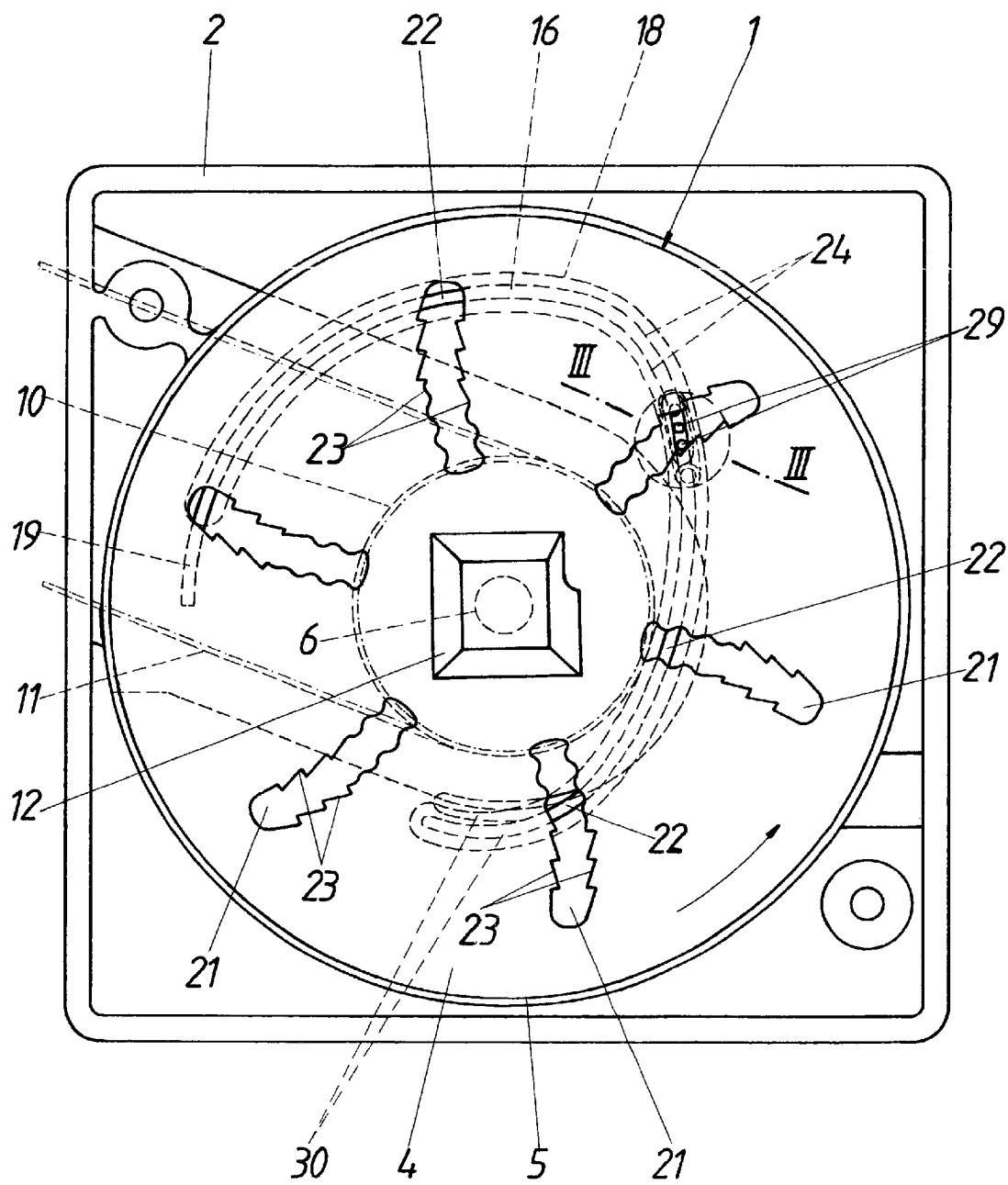
Figure 3:
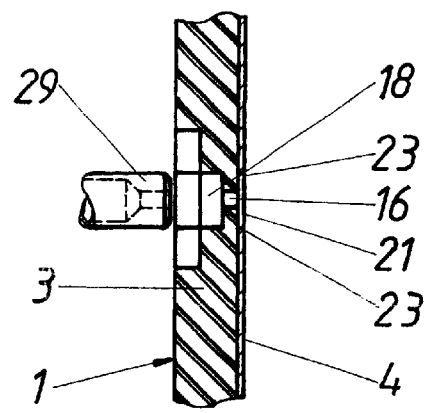
Figure 4:
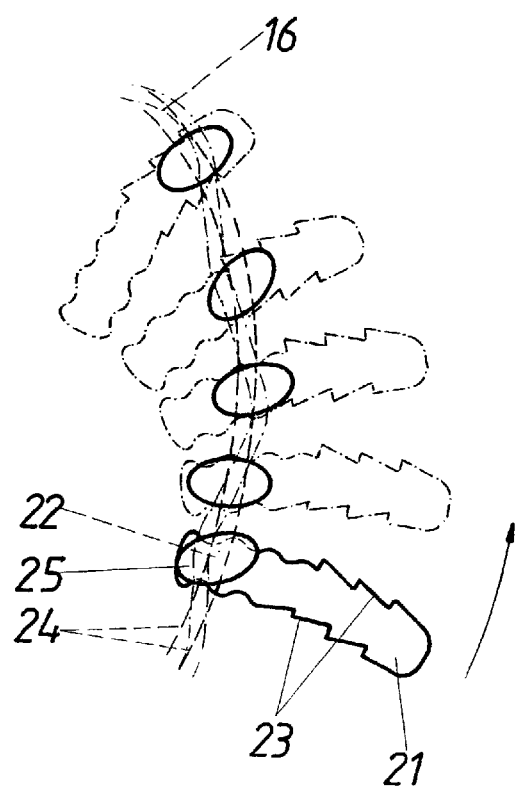
Figure 6:
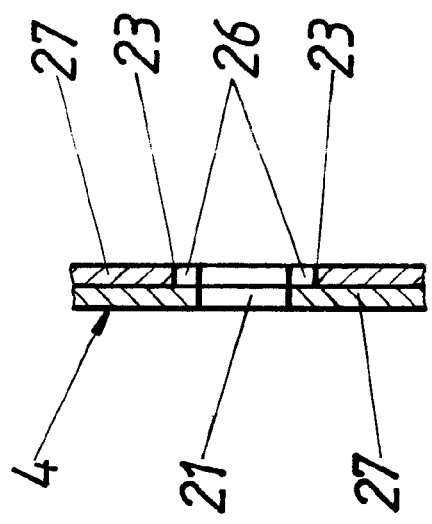
Figure 5:
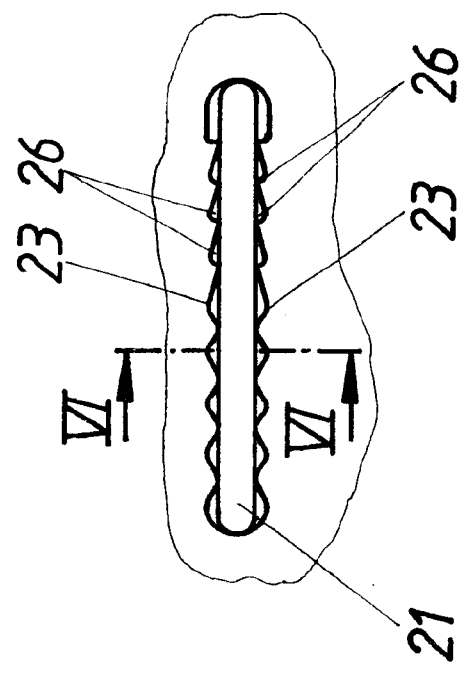

The inventive object is illustrated by way of example in the diagram, in which:

FIG. 1 shows a machine for sowing individual seed grains according to the present invention in section in the vicinity of the sowing discs in a simplified axial section, FIG. 2 shows a sowing disc in a front view from the side of the hopper on an enlarged scale, FIG. 3 shows a section along line III—III of FIG. 2, FIG. 4 is a diagrammatical representation of seed grain being conveyed along the guiding slot with reference to several successive pivot positions of a guiding slot, FIG. 5 is a structural variant of carrier slots of the conveyor disc in a plan view, and FIG. 6 shows a section along line VI—VI of FIG. 5 on an enlarged scale.

BEST METHOD FOR EXECUTING INVENTION

The machine for sowing individual seed grains according to the illustrated embodiment exhibits two laterally reversed sowing discs 1 which are mounted in a frame 2. Said sowing discs 1 consist of a disc body 3 and a conveyor disc 4 resting on this disc body 3. Whereas disc body 3 is mounted torsionally in cylindrical recesses 5 of frame 2, conveyor discs 4 are mounted on a drive shaft 6 which penetrates frame 2 and is borne in roller bearings 7. On one front side drive shaft 6 bears a connection top 8 which encloses tubular bearing housing 9 formed by frame 2 and has a chain wheel 10 for a chain drive 11, as in FIG. 2. The floor of connection head 8 also forms a receiving head 12 for conveyor disc 4 of a sowing disc 1. For conveyor disc 4 of opposite sowing discs 1 a similar receiving head 13 is screwed onto drive shaft 6. Receiving heads 12 and 13 having square receiving heads project axially into hoppers 14 which are attached on both sides of frame 2 and lie closely on conveyor discs 4, so that sowing discs 1 form the rear walls of hoppers 14. Hoppers 14 are connected to inlet channels 15 by way of lockable tanks, from which the seed enters hoppers 14, whereby the seed ends up lying in the vicinity of sowing discs 1 on account of the inclination of the walls of hopper 14. Receiving heads 12 and 13 jutting into hoppers 14 provide a pipe movement which prevents the seed from forming a bridge in the inlet area.

Disc bodies 3 of sowing discs 1 form a guiding slot 16 which runs from floor area 17 of attached hopper 14 (FIG. 1) along a curve extending in the rotational direction of conveyor disc 4 over a circumferential area of approximately 270°, as evident in FIG. 2. Said guiding slots 16 open out towards the connecting section of frame 2 in a widened groove 18 which ends however in front of downwards directed discharge end 19 of guiding slot 16. Frame 2 forms aspiration chambers 20 separated from one another and covered by disc bodies 3 of sowing discs 1, which are connected to an aspiration fan, such that guiding slots 16 of disc body 3 of both sowing discs 1 can be suctioned independently of one another.

Conveyor discs 4 of sowing discs 1 are provided with carrier slots 21 distributed evenly over the circumference and running essentially radially, which extend over the radial extension area of guiding slot 16 and form aspiration apertures 22 in the overlapping area with guiding slot 16. The seed grains are aspirated to aspiration apertures 22, which are bordered by crisscrossing slots 16 and 21, and are then discharged upwards from respective hopper 14 on account of the rotating of conveyor disc 4 along guiding slot 16 and are jettisoned in the vicinity of upwards directed discharge end 19 of guiding slot 16 outside hopper 14.

Compared to known sowing discs of this type longitudinal edges 23 of carrier slots 21 are configures corrugated in conveyor discs 4, so that the angles between these longitudinal edges 23 on the one hand and longitudinal edges 24 of guiding slot 16 on the other hand changes in the vicinity of aspiration apertures 22, if guiding slot 16 moves in a radial direction compared to carrier slots 21 when conveyor disc 4 rotates. The result of this is that a seed grain 25 aspirated onto an aspiration aperture 22 according to FIG. 4 is repeatedly turned on longitudinal corrugated edge 23 of carrier slots 21, when it is discharged along guiding slot 16 out of hopper 14. This to and fro rotational movement supports thinning out of seed grains 25, whenever additionally aspirated seed grains are displaced by rotating seed grain 25 and fall back into hopper 14. Because the width of carrier slots 21 is considerably greater than the width of guiding slot 16, aspirated seed grains 25 can lie advantageously between longitudinal edges 23 of carrier slots 21 on disc body 3, so that the seed grains can be prevented from penetrating more deeply into aspiration apertures 22. This arrangement of aspirated seed grains 25 on disc body 3 is of advantage not only for twisting the seed grains, but also improves the separation conditions in the vicinity of discharge end 19 of guiding slot 16, which otherwise obviates required bucket feeders for even discharge of the thinned out seed grains. As indicated in FIG. 4 in dot-and-dash lines, guiding slot 16 can also be provided with corrugated longitudinal edges, to ensure additional relative movement between slots 16 and 21. These measures serve to further improve the thinning out procedure.

According to FIGS. 2 and 4 longitudinal edges 23 of carrier slots 21 have a corrugated profile over the overall thickness of conveyor discs 4. This is not absolutely necessary though. Such corrugation of longitudinal edges 23 of carrier slots 21 could also be realised by means of edge-side depressions 26, as illustrated in FIGS. 5 and 6. So that these depressions 26 can be easily produced, conveyor discs 4 can be designed from two part discs 27 and 28, one part disc 27 facing hopper 14 exhibits slots with corrugated edge profile 23, while remaining part disc 28 forms slots with a straight edge profile.

So that the seed material can be discharged continuously, without the drive of conveyor discs 4 having to be interrupted, the aspiration impact of guiding slot 16 is generally switched off. In addition to this, nozzles 29 directed towards guiding slot 16 can be provided in the vicinity of a section rising from floor area 17 of hopper 14 of guiding slot 16, and advantageously in the vicinity of a partition dividing aspiration of guiding slot 16 into two sections. If nozzles 29 are impacted with compressed air, the seed grains discharged from hopper 14 are blown back into hopper 14 by sowing disc 1, in spite of the aspiration impact on the guiding slots being interrupted. The seed grains, which are already in the guiding slot section outside nozzles 29, are still discharged properly, since the aspiration effect on guiding slot 16 is not interrupted outside nozzles 29. Transition from one aspiration section of guiding slot 16 to the other must occur such that if nozzles 29 are shut off the seed grains continue to be aspirated in the transition area.

So that at least one seed grain is aspirated to sowing discs 1 in floor area 17 of hoppers 14, as long as there is still one seed grain remaining in hopper 14, the aspiration area in floor area 17 can advantageously be enlarged. This can occur by corresponding widening of guiding slot 16. According to FIG. 2 guiding slot 16 bifurcates into two branches 30, one of which is formed by an additional groove in disc body 3.

What is claimed is:

1. A machine for sowing individual seed grains with at least one hopper open towards a vertical sowing disc comprising a stationary disc body aspirated on the side averted from the hopper and having at least one guiding slot, and a driveable conveyor disc resting on the side of the hopper on the disc body and having carrier slots distributed over the circumference and extending over the radial extension area of the at least one guiding slot, the carrier slots forming aspiration apertures in the overlapping area with the at least one guiding slot for the seed grains discharged along the guiding slot from the hopper, the angle between the longitudinal edges of the carrier slots and of the at least one guiding slot in the overlapping area increasing and decreasing repeatedly at least on one slot side along the guiding slot within a predetermined angle range.

2. Machine for sowing individual seed grains as claimed in claim 1, wherein the longitudinal edges exhibit a corrugated profile.

3. Machine for sowing individual seed grains as claimed in claim 1, wherein the longitudinal edges are provided with edge-side depressions to form the corrugated profile.

4. Machine for sowing individual seed grains as claimed in claim 1, wherein the at least one guiding slot exhibits less width than the carrier slots in the conveyor disc.

5. Machine for sowing individual seed grains as claimed in claim 1, wherein at least one nozzle directed towards the at least one guiding slot is provided in the vicinity of a section of the at least one guiding slot rising from a floor area of the hopper.

* * * * *